US010537982B2

(12) United States Patent
Prunean

(10) Patent No.: US 10,537,982 B2
(45) Date of Patent: Jan. 21, 2020

(54) ANCHOR DRIVER

(71) Applicant: David C. Prunean, Camas, WA (US)

(72) Inventor: David C. Prunean, Camas, WA (US)

( * ) Notice: Subject to any disclaimer, the term of this patent is extended or adjusted under 35 U.S.C. 154(b) by 90 days.

(21) Appl. No.: 15/877,372

(22) Filed: Jan. 22, 2018

(65) Prior Publication Data

US 2018/0141190 A1 May 24, 2018

Related U.S. Application Data

(60) Continuation-in-part of application No. 15/423,509, filed on Feb. 2, 2017, now Pat. No. 10,323,671, which is a division of application No. 13/726,086, filed on Dec. 22, 2012, now Pat. No. 9,592,592.

(60) Provisional application No. 61/579,765, filed on Dec. 23, 2011.

(51) Int. Cl.

| | |
|---|---|
| ***B23Q 3/00*** | (2006.01) |
| ***B25B 21/00*** | (2006.01) |
| ***B25B 31/00*** | (2006.01) |
| ***B25B 23/00*** | (2006.01) |
| ***B25D 17/02*** | (2006.01) |

(52) U.S. Cl.
CPC ............ *B25B 21/007* (2013.01); *B25B 23/00* (2013.01); *B25B 31/00* (2013.01); *B25D 17/02* (2013.01); *Y10T 279/3418* (2015.01)

(58) Field of Classification Search
CPC ....... B25B 21/007; B25B 31/00; B25B 23/00; B25D 17/02; B25C 11/00
See application file for complete search history.

(56) References Cited

U.S. PATENT DOCUMENTS

| | | | | |
|---|---|---|---|---|
| 9,592,592 | B2 * | 3/2017 | Prunean | B25B 21/007 |
| 10,323,671 | B2 * | 6/2019 | Prunean | F01D 25/18 |
| 2013/0161038 | A1 * | 6/2013 | Prunean | B25B 21/007 173/1 |
| 2017/0146043 | A1 * | 5/2017 | Prunean | F01D 25/18 |
| 2018/0141190 | A1 * | 5/2018 | Prunean | B25B 31/00 |

* cited by examiner

*Primary Examiner* — Lee D Wilson
(74) *Attorney, Agent, or Firm* — Cionca IP Law P.C.; Marin Cionca

(57) ABSTRACT

A wedge anchor driver for driving an anchor having a bolt into a surface such that a portion of the bolt is exposed, the wedge anchor driver having a flute extending between a top end and a shaft, the flute housing a plurality of cavities having a first cavity configured to fit onto a first nut, the first cavity having a first socket size; a second cavity configured to fit onto a second nut, the second cavity having a second socket size smaller than the first socket size; and a third cavity configured to receive the portion of the bolt; wherein the anchor driver shaft is lockable into a hammer drill, such that a user can drive the anchor into a corresponding hole with the hammer drill in a hammer mode, and then tighten the first nut or the second nut by switching the hammer to a drill mode.

12 Claims, 10 Drawing Sheets

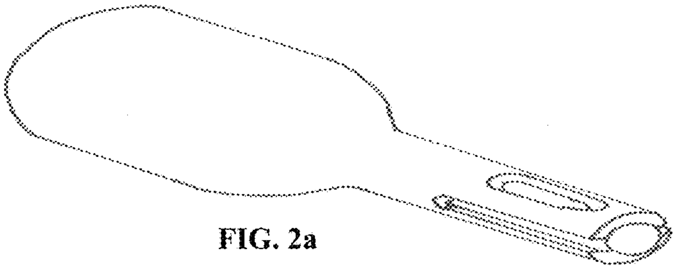
FIG. 2a
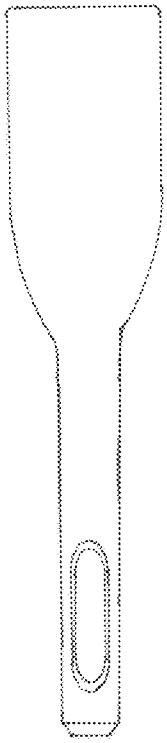
FIG. 2b
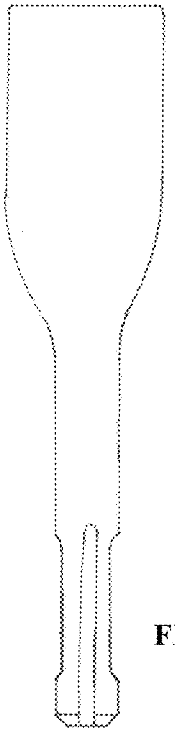
FIG. 2c
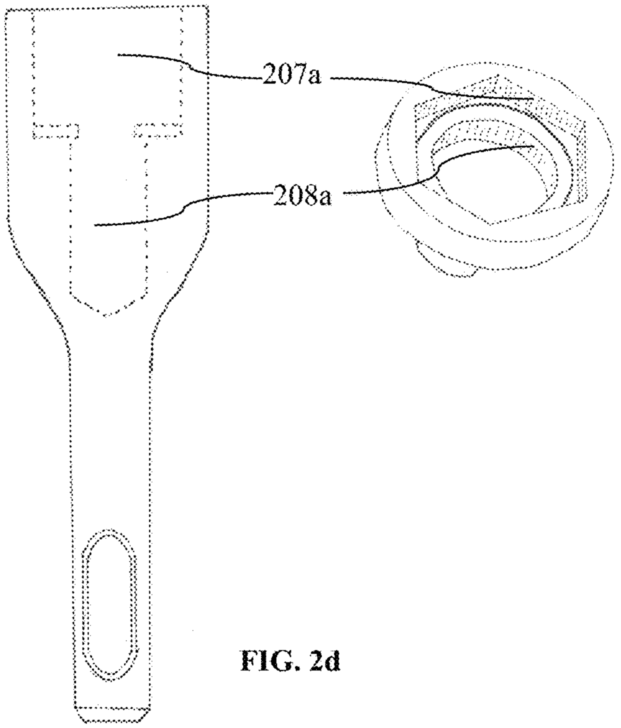
FIG. 2e
FIG. 2d

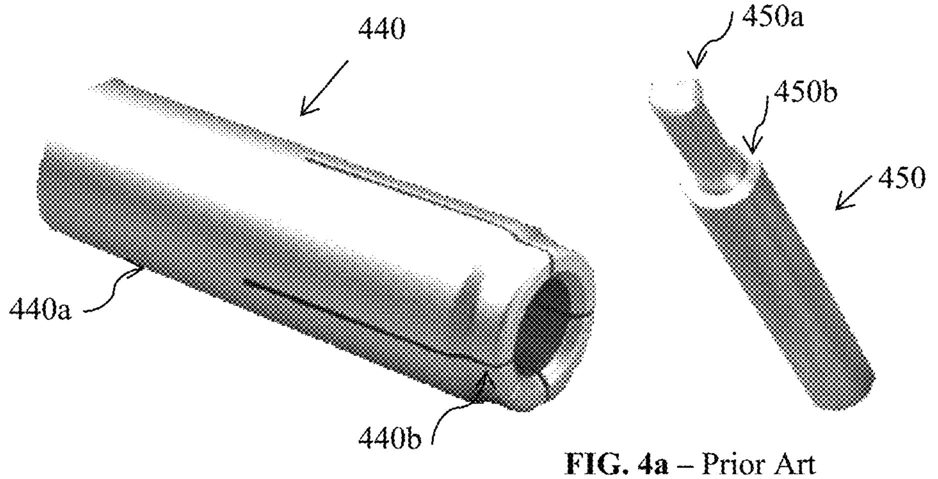
FIG. 4a – Prior Art
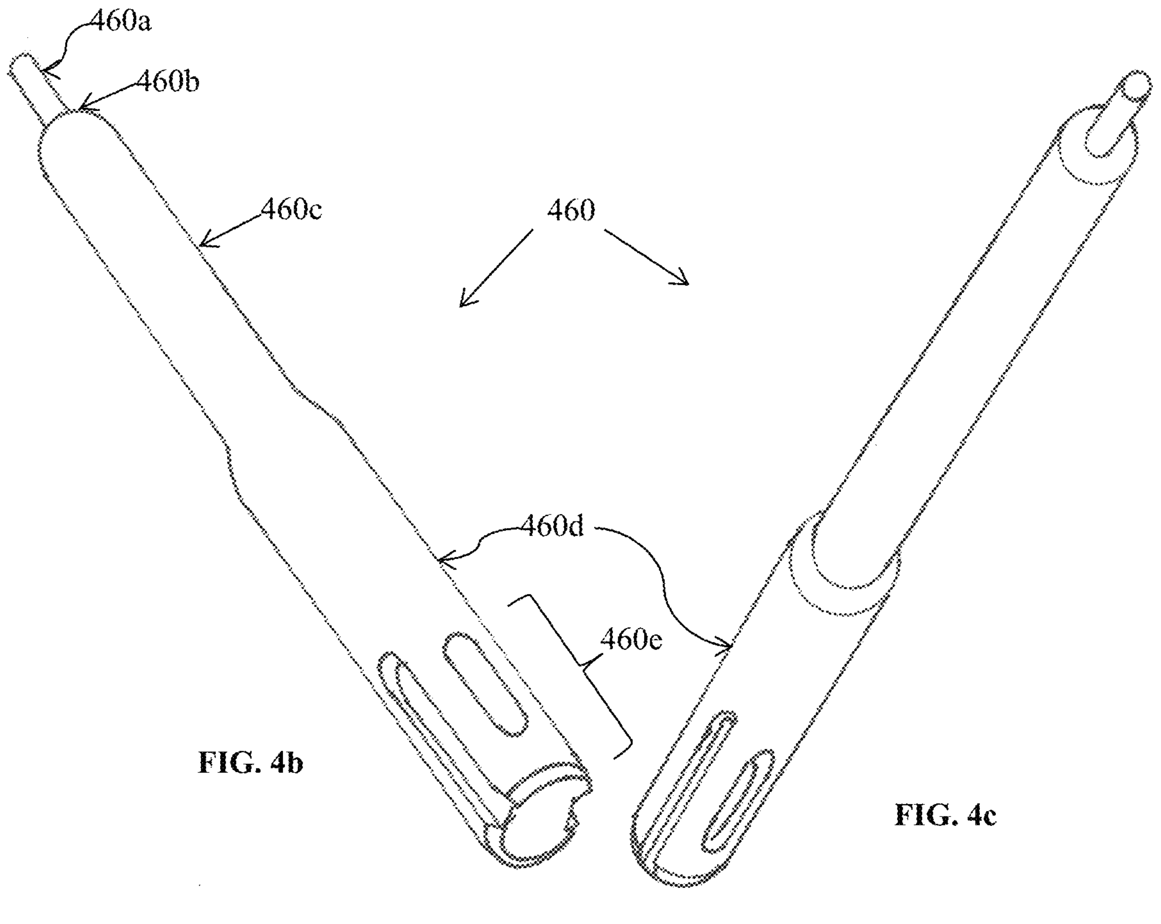
FIG. 4b
FIG. 4c

ANCHOR DRIVER

CROSS-REFERENCE TO RELATED APPLICATIONS

This application is a continuation-in-part application of and claims the benefit of U.S. Non-Provisional application Ser. No. 15/423,509, filed Feb. 2, 2017, which is a divisional application of U.S. Non-Provisional application Ser. No. 13/726,086, filed on Dec. 22, 2012, which claims the benefit of U.S. Provisional Application No. 61/579,765, filed Dec. 23, 2011, which are hereby incorporated by reference, to the extent that they are not conflicting with the present application.

BACKGROUND OF INVENTION

1. Field of the Invention

The invention relates generally to the tool technology and more particularly to tools for installing anchors in concrete.

2. Description of the Related Art

Currently, with the existing tools and methods, installing anchors in concrete is a slow, labor intensive and costly process, as it involves a significant amount of manual labor.

The process used to fasten anchors to concrete has basically remained unchanged over the years. Although there are epoxy/chemical type anchors in use today, the majority of concrete anchors still rely on the same principles that were developed many years ago. Typically, a hole with a certain amount of volume is made and then additional material is inserted into the hole. This increased volume of material pushes against the interior wall of the hole and creates friction. This friction is how most mechanical concrete anchors obtain their holding values.

All mechanical type concrete anchors work based on the same basic principle: drill a specific size hole, insert the anchor and expand the anchor inside the hole in order to make it difficult for the anchor to be pulled out of the hole.

Fastening to concrete is unique compared to other fastening applications, such as fastening two pieces of metal together by using a screw or a bolt and a nut. Concrete anchors are much more difficult to install and use. At the same time, concrete is the most widely used base material in the world for the last 2000 years and probably will remain so for the next 2000 years due to its simplicity, strength, versatility and the abundance of the ingredients used to make it.

The process with which anchors are currently fastened to concrete typically includes the following steps: a hole is made in the concrete; then, the anchor is inserted in the hole to take up the space created, and the material in or on the anchor is expanded in the hole, by manually hammering directly on the anchor or hammering on a setting tool; and then, finally, a bolt or a nut, depending on the type of anchor used, is manually ratcheted into place. Obviously, the process is labor intensive and slow, and thus, costly and inefficient.

Thus, there is a need for new and improved tools and methods that address the problems described above.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a wedge anchor driver is disclosed. In another exemplary embodiment, a drop-in anchor driver is disclosed. Both drivers are installable in a typical hammer drill. Thus, an advantage is that a considerable amount of manual labor needed to drive and secure the anchors is eliminated. Another advantage is that the process of installing anchors is much faster and efficient.

In another aspect, a wedge anchor driver for driving a wedge anchor having a bolt into an installation surface such that a portion of the bolt is exposed out of the installation surface is provided, the wedge anchor driver comprising: a top end; an anchor driver shaft at a bottom end; a flute extending between the top end and the anchor driver shaft, the flute housing a plurality of cavities comprising: a first cavity at the top end, the first cavity being configured to fit onto a first nut of the wedge anchor, and the first cavity having a first hex socket size; a second cavity below the first cavity, the second cavity being configured to fit onto a second nut, the second cavity having a second hex socket size smaller than the first socket size; and a third cavity below the second cavity, the third cavity being configured to receive the portion of the bolt; a drop-in anchor attachment for driving a drop-in anchor having an expander plug, the drop-in anchor attachment having three coaxial sections comprising: a pin having a first diameter, the pin being insertable into the drop-in anchor to push the expander plug into the drop-in anchor; an attachment flute having a second diameter greater than the first diameter for creating a stop area; and an attachment shaft having a third diameter greater than the second diameter, wherein the attachment flute extends between the pin and the attachment shaft; and wherein the attachment shaft is removably associated with the first cavity such that the wedge anchor driver can be adapted to drive the drop-in anchor; and wherein the anchor driver shaft is configured to fit and be lockable into a hammer drill, such that after the wedge anchor driver is locked into the hammer drill, a user can drive the wedge anchor or the drop-in anchor into a corresponding hole with the hammer drill in a hammer mode, and then tighten the first nut or the second nut by switching the hammer drill from the hammer mode to a drill mode. An advantage may be that a single tool may be used for both hammering in an anchor as well as tightening the nuts of the anchor, and a single tool may be used for both wedge anchors and drop-in anchors. Another advantage is that the speed, efficiency, and safety of installing anchors may be increased for the user as opposed to installation of the anchors by hand. Another advantage is that a hammer drill can be used to perform the installation of an anchor onto an installation surface while a portion of the anchor bolt protrudes from the surface, due to the portion of the bolt being received into the anchor driver while the anchor driver, powered by the hammer drill, hammers in the anchor or tightens the nuts of the anchor. Another advantage may be that the anchor installation or installation of any other equipment to the installed anchor may be done one-handed. Another advantage may be that a single tool may be used for hammering in the anchor and for tightening the nuts of the anchor, and switching tools is not needed for user, which, again, may increase the speed and efficiency of anchor installation.

In another aspect, a wedge anchor driver for driving an anchor having a bolt into an installation surface such that a portion of the bolt is exposed out of the installation surface is provided, the wedge anchor driver comprising: a top end; an anchor driver shaft at a bottom end; a flute extending between the top end and the anchor driver shaft, the flute housing a plurality of cavities comprising: a first cavity at the top end, the first cavity being configured to fit onto a first nut of the wedge anchor, and the first cavity having a first socket size and a first length; a second cavity below the first cavity, the second cavity being configured to fit onto a second nut, the second cavity having a second socket size smaller than the first socket size and a second length greater than the first length; and a third cavity below the second cavity, the third cavity being configured to receive the portion of the bolt; wherein the anchor driver shaft is configured to fit and be lockable into a hammer drill, such that after the wedge anchor driver is locked into the hammer drill, a user can drive the anchor into a corresponding hole with the hammer drill in a hammer mode, and then tighten the first nut or the second nut by switching the hammer drill from the hammer mode to a drill mode. Again, an advantage may be that a single tool may be used for both hammering in an anchor as well as tightening the nuts of the anchor. Another advantage is that the speed, efficiency, and safety of installing anchors may be increased for the user as opposed to installation of the anchors by hand. Another advantage is that a hammer drill can be used to perform the installation of an anchor onto an installation surface while a portion of the anchor bolt protrudes from the surface, due to the portion of the bolt being received into the anchor driver while the anchor driver, powered by the hammer drill, hammers in the anchor or tightens the nuts of the anchor. Another advantage may be that the anchor installation or installation of any other equipment to the installed anchor may be done one-handed. Another advantage may be that a single tool may be used for hammering in the anchor and for tightening the nuts of the anchor, and switching tools is not needed for user, which, again, may increase the speed and efficiency of anchor installation.

In another aspect, a method of installing an anchor having a bolt into an installation surface such that a portion of the bolt is exposed out of the installation surface is provided, using a hammer drill and a wedge anchor driver comprising a top end; an anchor driver shaft at a bottom end; a flute extending between the top end and the anchor driver shaft, the flute housing a plurality of cavities comprising: a first cavity at the top end, the first cavity being configured to fit onto a first nut of the anchor, and the first cavity having a first hex socket size and a first length; a second cavity below the first cavity, the second cavity being configured to fit onto a second nut, the second cavity having a second hex socket size smaller than the first socket size and a second length greater than the first length; and a third cavity below the second cavity, the third cavity being configured to receive the portion of the bolt; the method comprising the steps of: drilling a hole into the installation surface; associating the shaft with a chuck of the hammer drill to create a first assembly; setting the hammer drill to a hammer mode; hammering the anchor into the hole using the first assembly; switching the hammer drill from the hammer mode to a drill mode; tightening the first nut by receiving the first nut into the first cavity; and tightening a second nut onto the bolt by receiving the bolt into the third cavity and receiving the second nut into the second cavity. Again, an advantage may be that a single tool may be used for both hammering in an anchor as well as tightening the nuts of the anchor. Another advantage is that the speed, efficiency, and safety of installing anchors may be increased for the user as opposed to installation of the anchors by hand. Another advantage is that a hammer drill can be used to perform the installation of an anchor onto an installation surface while a portion of the anchor bolt protrudes from the surface, due to the portion of the bolt being received into the anchor driver while the anchor driver, powered by the hammer drill, hammers in the anchor or tightens the nuts of the anchor. Another advantage may be that the anchor installation or installation of any other equipment to the installed anchor may be done one-handed. Another advantage may be that a single tool may be used for hammering in the anchor and for tightening the nuts of the anchor, and switching tools is not needed for user, which, again, may increase the speed and efficiency of anchor installation.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 2*a* illustrates a back perspective view of a solid wedge anchor driver, according to an aspect.

FIGS. 2*b*-2*c* illustrate side views of the solid wedge anchor driver from FIG. 2*a*, according to an aspect.

FIG. 2*d* illustrates a side view of the solid wedge anchor driver from FIG. 2*a* depicting also the inside openings shown in perspective in FIG. 2*e*, according to an aspect.

FIG. 2*e* illustrates a front perspective view of the solid wedge anchor driver from FIG. 2*a*, according to an aspect.

FIG. 4*a* illustrates a perspective view of a typical drop-in anchor (prior art) and of a manual drop-in setting tool (prior art), according to an aspect.

FIGS. 4*b*-4*c* illustrate back and front perspective views, respectively, of a solid drop-in anchor driver, according to an aspect.

DETAILED DESCRIPTION

Figure 1:
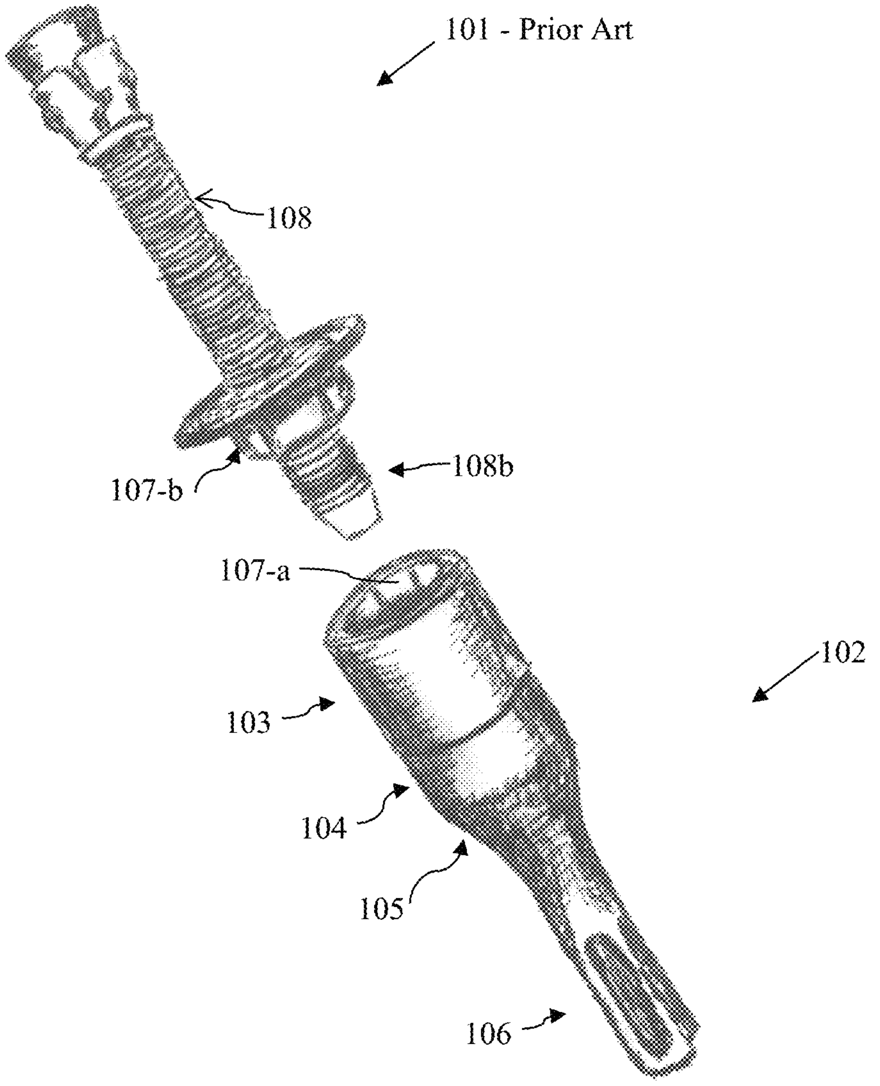
FIG. 1 illustrates the perspective view of a typical wedge anchor (prior art), and an adjustable wedge anchor driver according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

FIG. 1 illustrates the perspective view of a typical wedge anchor (prior art) 101, and an adjustable wedge anchor driver 102 according to an aspect. The wedge anchor 101 is an example of a typical wedge anchor known in the art. The adjustable wedge anchor driver 102 is an example of one of the embodiments of the invention disclosed herein. The adjustable wedge anchor driver 102 essentially consists of two concentric cylinders, 103 and 104, having substantially the same or different diameters, whereby the two cylinders 103, 104 are positioned end-to-end, and may be removably joined together via a connection (see 312 and 314 in FIGS. 3*a*-3*d*) similar to, for example, that of a tool used to install a typical socket on a socket wrench.

The first cylinder 103, which is on the front end of the two-cylinder assembly, may be in essence a modified socket (preferably stronger though) for a socket wrench, with an opening 107-*a* configured to fit onto the nut 107-*b* of the wedge anchor 101 and also configured with an opening (see 308*a* in FIGS. 3*b* and 3*d*), to accommodate the outer bolt end 108*b*, so that a user may, after the wedge anchor driver is secured in the chuck of a hammer drill as it will be explained in more details later, employ the wedge anchor driver 102 to press the bolt 108 in a concrete hole and tighten the nut 107-*b*.

The back end of the second cylinder 104, may be connected, removably or irremovably, to a shank or shaft 106. The shank 106 may be configured to be capable of being installed in the chuck of any standard hammer drill. The shank 106 allows the wedge anchor driver 102 to be used in conjunction with a standard hammer drill, as opposed to a manual use of the driver, which dramatically increases the speed of installing wedge anchors, as it will be described and explained in more details later herein.

For increased strength, it may be preferable to construct the second cylinder 104 and the shank 106 as one piece, through known manufacturing processes such as casting, welding and/or machining Furthermore, for increasing the strength of the wedge anchor driver 102, while still maintaining control over the volume and the weight of the driver, as shown in FIG. 1, a conical transition section 105 may be used.

It should be apparent that, the shape and size, such as the outside diameter of the first cylinder 103 and the size of its opening 107-*a*, could vary as necessary to correspond to the standard sizes of the wedge anchors available on the market, or to other shapes and sizes of wedge anchors which a user may wish to use. It should also be apparent that the length of first cylinder 103, as well as its internal configuration (see 307*a* and 308*a* in FIGS. 3*b* and 3*d*) must be such that it may accommodate the outer end 108*b* of the bolt 108 of the wedge anchor 101.

It should be apparent that the first and the second cylinder 103 and 104, may have other shapes, besides the cylinder-like shape shown and suggested by the nomenclature used herein.

In most cases, it is preferable that the wedge anchor driver 102 measures approximately 5 (five) inches in length.

FIG. 2*a* illustrates a back perspective view of a solid wedge anchor driver, according to an aspect.

FIGS. 2*b*-2*c* illustrate side views of the solid wedge anchor driver from FIG. 2*a*, according to an aspect.

FIG. 2*d* illustrates a side view of the solid wedge anchor driver from FIG. 2*a* depicting also the inside openings 207*a* and 208*a* shown in perspective in FIG. 2*e*, according to an aspect.

FIG. 2*e* illustrates a front perspective view of the solid wedge anchor driver from FIG. 2*a*, according to an aspect. As the name suggests, and as shown, the solid wedge anchor drivers depicted in FIG. 2*a*-2*e* are constructed as a one-piece tool, one for each size of wedge anchors. In other words, the first cylinder 103, the second cylinder, and shank 106 (as shown in FIG. 1) are all integrated in one piece. Thus, solid wedge anchor drivers may need to be manufactured and provided or sold as a set, so that a user has one available for all typical shapes and sizes of wedge anchors.

For each solid wedge anchor driver in a set, the first opening 207*a* needs to be shaped and sized to fit a particular size and shape of the nut 107-*b* (FIG. 1). Similarly, the second opening 208*a* needs to be shaped and sized to fit a particular size, shape and expected length (after tightening of nut 107-*b*) of the bolt end 108*b* (FIG. 1).

The solid wedge anchor driver may be advantageous to use, for example, when working with a single size of wedge anchor, which needs to be installed repeatedly. It should also be apparent, that the solid wedge anchor driver offers increased strength, which may be critical when performing heavy duty jobs. One difference between the adjustable wedge anchor driver, depicted in FIG. 1 and FIGS. 3*a*-3*d*, and the solid wedge anchor drivers depicted in FIGS. 2*a*-2*e* is that the member 309 (FIGS. 3*a* and 3*c*) that locks into the hammer drill, in the adjustable version, is universal for all "socket" (i.e., first cylinder 303) sizes. This may be advantageous, for example, when working with several sizes of wedge anchors at the same time, as only a quick replacement of first cylinder 303 would be necessary, after only a one-time installation of member 309 in the chuck of the hammer drill.

Figure 3A:
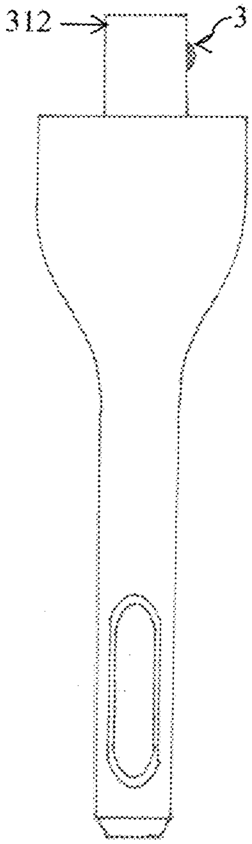
FIGS. 3*a*-3*b* illustrate a side view of the adjustable wedge anchor driver from FIG. 1, with the first cylinder being detached, according to an aspect.
Figure 3B:
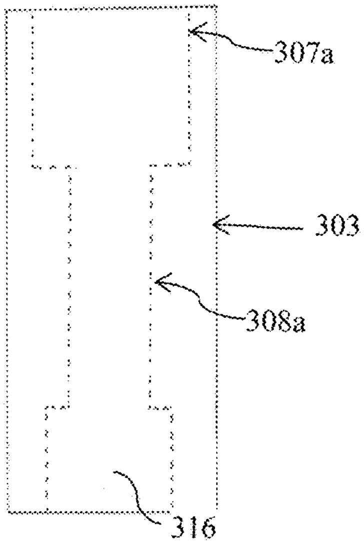

FIGS. 3*a*-3*b* illustrate a side view of the adjustable wedge anchor driver 102 from FIG. 1, with first cylinder 303 (103 in FIG. 1) being detached, according to an aspect.

Figure 3C:
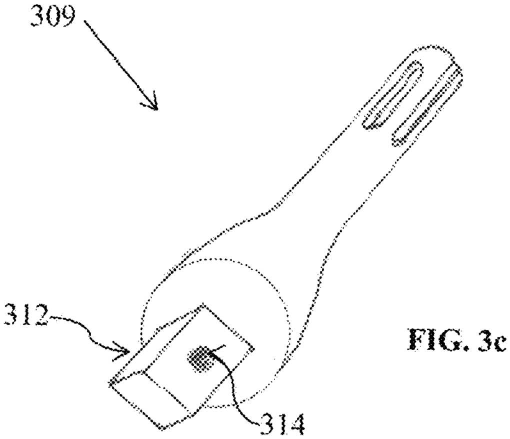
FIGS. 3*c*-3*d* illustrate a front perspective view of the adjustable wedge anchor driver 102 from FIG. 1, with the first cylinder being detached, according to an aspect.
Figure 3D:
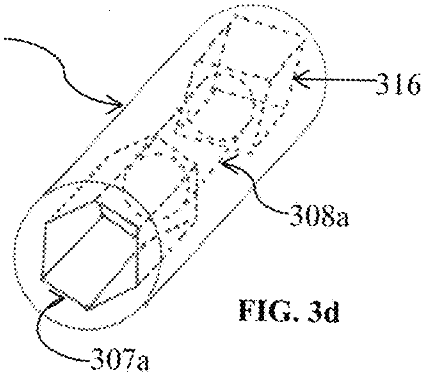

FIGS. 3*c*-3*d* illustrate a front perspective view of the adjustable wedge anchor driver 102 from FIG. 1, with first cylinder 303 being detached, according to an aspect. Thus, as shown in FIGS. 3*a* and 3*c*, a rectangular protrusion 312 that contains a spring-loaded ball mechanism 314 may be used to keep the first cylinder 303 in place. The rectangular protrusion 312 may fit into the third opening 316 of the first cylinder 303.

Again, the first cylinder has a first opening 307*a*, having, for example, a hexagonal cross-section, sized to fit a particular size of a nut 107-*b* (FIG. 1) of a typical wedge anchor. Similarly, the first cylinder 303 has a second opening 308*a* shaped and sized to fit the expected length of the bolt end 108*b* (FIG. 1), after the tightening of the nut 107-*b*, once the wedge anchor is in place, as will be explained in more details later. If, for example, after tightening, the expected length of the bolt end 108*b* is between ¾ inches and 1 (one) inch, the length of second opening 308*a* has to be at least 1 (one) inch.

As is the case with the solid wedge anchor drivers, there also may be a set of sizes for the adjustable wedge anchor driver; however, this set would include only one installation member 309 and a set of first cylinders 303 of various sizes.

Testing of prototypes show that the solid wedge anchor driver is longer lasting for heavy use such as in construction work. However, at the same time, the adjustable wedge anchor driver is more attractive for its variations that can be accommodated in a small kit, which can be stored in a confined space, such as in the limited available space of a rescue vehicle.

FIG. 4*a* illustrates a perspective view of a typical drop-in anchor 440 (prior art) and of a manual drop-in setting tool 450 (prior art), according to an aspect. As known in the art, drop-in anchors 440 are female anchors designed to be placed and fastened in concrete, or other hard material, and then to have a threaded rod or bolt (not shown) fastened to it. The drop-in anchor 440 is typically made-up of two parts: the expansion shield 440*a* (made from zinc plated carbon or stainless steel) and a case hardened expander plug (not shown) that is cone-shaped and also made typically from zinc plated carbon or stainless steel. As shown in FIG. 4*a*, one end of the shield 440*a* is normally tapered, and has four cut slots 440*b* that run a portion of its length. The surface of the tapered end may be smooth or knurled while the other end is typically smooth. The expander plug is placed at the end of the anchor 440 that has the four slots 440*b*, while the other end of the anchor is threaded, such that a bolt or threaded rod may be screwed into the anchor.

The anchor is set by placing the anchor into a hole in concrete or other similar materials, and by setting the expander plug using a manual setting tool 450. Each diameter of drop-in anchor 440 has typically a specific, corresponding manual setting tool 450. As shown in FIG. 4*a*, the manual setting tool 450 is typically a steel rod with one end 450*a* being necked down. Once the drop-in anchor 440 is inserted into the concrete hole, the necked down portion 450*a* of the manual setting tool 450 is inserted into the drop-in anchor 440. The manual setting tool 450 is then pounded with a hammer by a worker until the lip of the anchor (not shown) meets the lip 450*b* of the manual setting tool 450. This action pushes the expander plug (not shown) down into the drop-in anchor 440 expanding the portion of the anchor where the four cuts 440*b* are.

As with all female type anchors, the size of the designated size of the anchor correlates with the bolt size that goes into the anchor. Also, as one of ordinary skills knows, generally, the hole size in the concrete, is slightly larger than the anchor size.

It should be apparent that the prior art manual setting of the drop-in anchor described above is labor intensive, show, inefficient, and thus, costly. Thus, there is a need for a new and improved drop-in anchor driver that addresses these problems.

FIGS. 4*b*-4*c* illustrate back and front perspective views, respectively, of a solid drop-in anchor driver, according to an aspect.

Figure 4D:
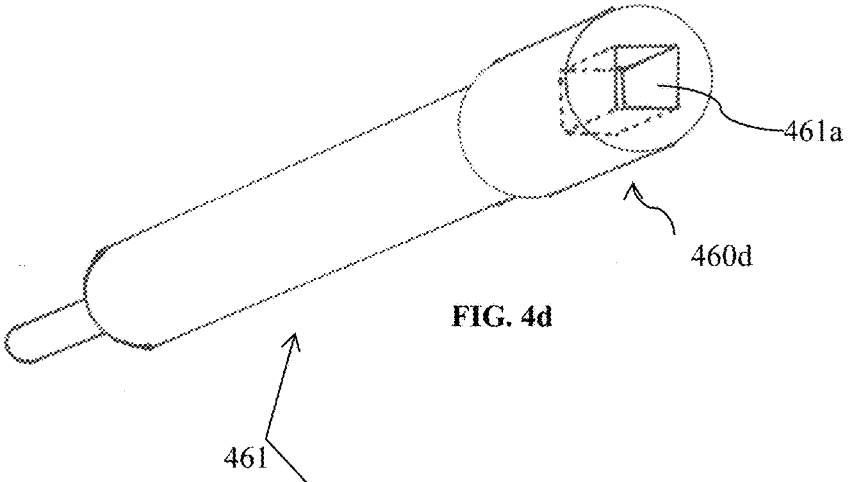
FIGS. 4*d*-4*e* illustrate back and front perspective views, respectively, of an adjustable drop-in anchor driver, according to an aspect.
Figure 4E:
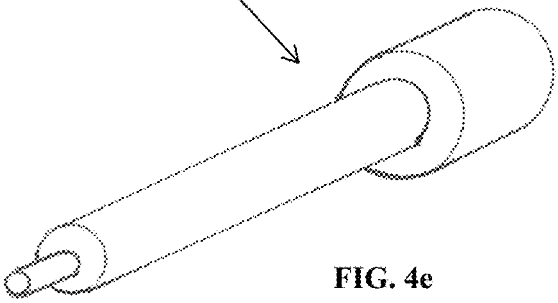

FIGS. 4*d*-4*e* illustrate back and front perspective views, respectively, of an adjustable drop-in anchor driver, according to an aspect.

Figure 4F:
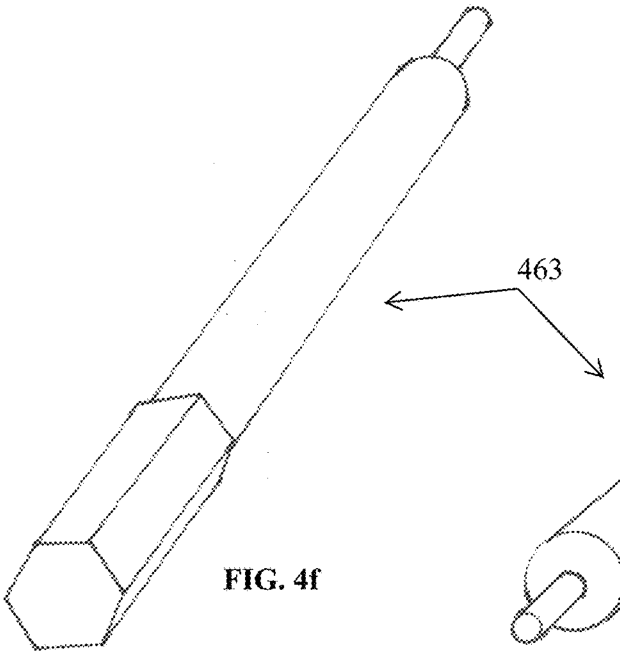
FIGS. 4*f*-4*g* illustrate back and front perspective views, respectively, of a solid hex drop-in anchor driver, according to an aspect.
Figure 4G:
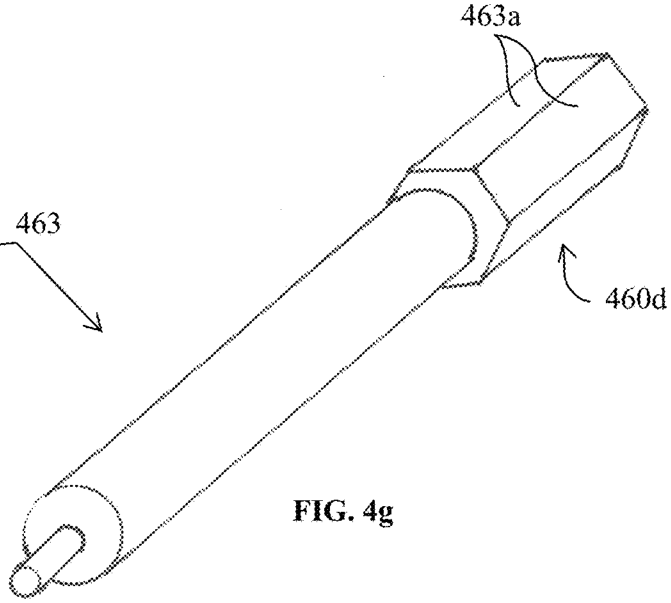

FIGS. 4*f*-4*g* illustrate back and front perspective views, respectively, of a solid hex drop-in anchor driver, according to an aspect.

As suggested by FIGS. 4*b*-4*g*, when it comes to drop-in anchor drivers, configured to be used for a more efficient installation of drop-in anchors 440, there are actually at least three possible variations. The first, as seen in FIGS. 4*b*-4*c*, is the solid drop-in anchor driver, which pretty much means that it is its own full solid pin driving bit, installable in a standard hammer drill, and therefore, has to come in various sizes (e.g., as a set or kit) to accommodate various sizes of the drop-in anchors.

As shown in FIGS. 4*b*-4*c*, the solid drop-in anchor driver 460 has a first section 460*a* of a first diameter, which will be inserted into the drop-in anchor 440 to push the expander plug (not shown) into the drop-in anchor 440 for the purpose described earlier. It should be noted that the diameter and the length of the first section 460*a* will correlate with the size (diameter and length) of the respective drop-in anchor. Next, the solid drop-in anchor driver 460 has a second section 460*c* of a larger, second diameter, for strength purposes, and for creating the stop area 460*b* that will stop the second section 460*c* from entering into the drop-in anchor 440, thus, indicating how much the solid drop-in anchor driver 460 should be pushed into the drop-in anchor 440. Thus, it should be understood that the diameter of the second section 460*c* is preferably greater than the inside diameter of the drop-in anchor 440, for the purposes described above (i.e., increased strength and to function as a stop indicator).

Next, the solid drop-in anchor driver 460 has a third section 460*d* typically, as shown, having an even greater, third diameter than the second section 460*c*, for increasing the overall strength of the driver. The third section 460*d* is the section that is inserted, completely or partially, and then fastened, into a chuck of a standard hammer drill. Thus, as shown, a portion 460*e* of the third section 460*d* is configured (e.g., as shown for exemplification purposes only, with channels and depressions) to fit and be able to be properly fastened into the chuck of a standard hammer drill. Thus, naturally, the configuration of portion 460*e* will correspond with the type of hammer drill intended to be used.

Thus, to more efficiently set drop-in anchors 440, instead of manually hammering a manual setting tool 450 as described earlier, a user can use the solid drop-in anchor driver 460 installed into a standard hammer drill, which is set in the hammer position, to more rapidly, easier, and thus, more affordably, set a plurality of drop-in anchors at any given time.

The second variation of drop-in anchor driver, as seen in FIGS. 4*d*-4*e*, is the adjustable, socket-type, drop-in anchor driver, which means that it simply has a socket type of adapter 461*a* at the end of the third section 460*d* of the driver. This feature makes the adjustable drop-in driver 461 usable with, and/or combinable in (e.g., for sale purposes), for example, a set that includes a whole socket kit and a set of socket drop-in anchor drivers, or, in a set including only one installation member 309 (FIG. 3*c*), a set of first cylinders 303 (FIGS. 3*b*, 3*d*) of various sizes and a set of adjustable drop-in anchor drivers of various sizes to fit common drop-in anchor sizes. The socket adapter 461*a* has the advantage that, for example, once the installation member 309 (FIG. 3*c*), is installed in a hammer drill, a fast and easy solution is provided to the user by simply changing to the adjustable drop-in anchor driver 461, or to the socket (or first cylinder 303) as necessary to drive in drop-in anchors or wedge anchors, respectively.

Finally, the third variation, as seen in FIGS. 4_f_-4_g_, is the solid hex drop-in anchor driver 463. This driver simply has the third section 460_d_ as a solid hex 463_a_, so that it may be placed in a certain size socket (or first cylinder 303) and then be used for driving the drop-in driver 463 into the drop-in anchor 440. This means that each hex end 463_a_ size would preferably vary with the size of the driver, and furthermore, the hex end 463_a_ would be manufactured per bolt size necessary for the drop-in anchor that the driver drives. This arrangement will make possible to use the same socket (or first cylinder 303) to drive the driver in the drop-in anchor and, and then to drive in the bolt of the drop-in anchor. Furthermore, as described above when referring to the socket/adjustable drop-in anchor 461, similar sets or kits may be used, manufactured or sold together with the solid hex drop-in anchor driver 463, as the solid hex end 463_a_ makes this driver installable in a socket or a first cylinder 303 of such sets or kits.

Figure 5A:
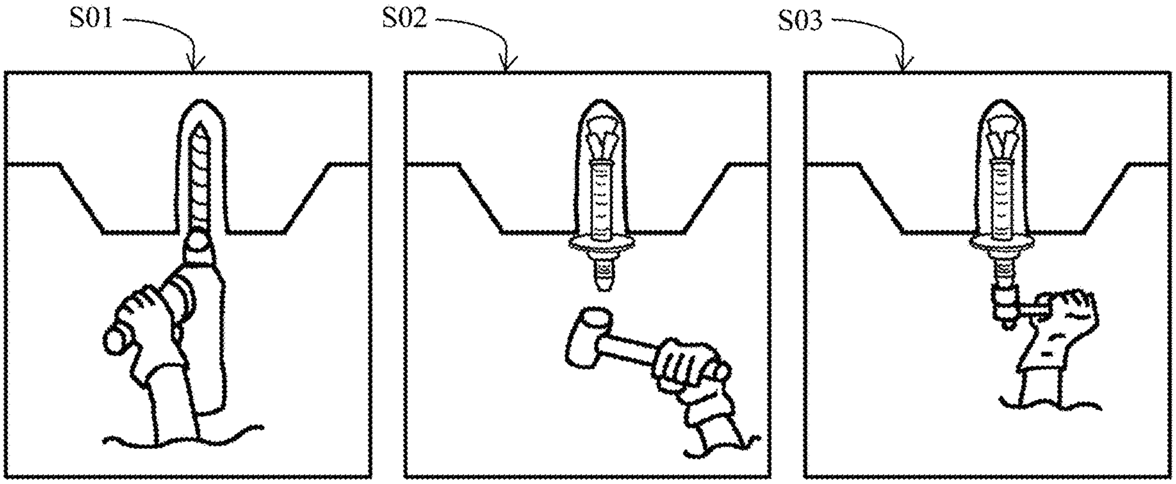
FIG. 5a Prior Art
FIG. 5*a* illustrates the typical steps of an exemplary existing (prior art) process used for fastening anchors to concrete, according to an aspect.
Figure 5B:
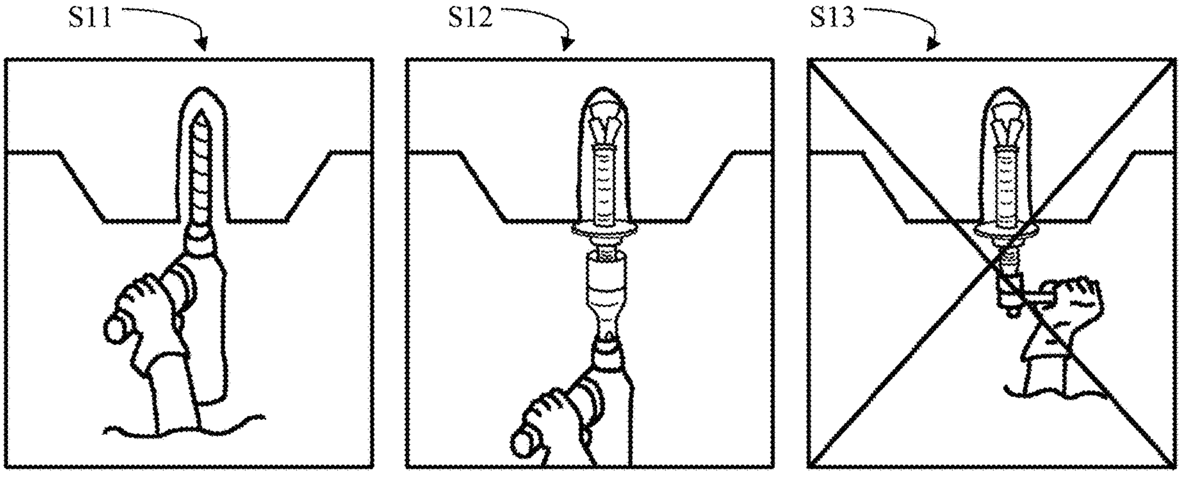
FIG. 5*b* illustrates a new and improved exemplary process of installing anchors, according to an aspect.

FIG. 5_a_ illustrates the typical steps of an exemplary existing (prior art) process used for fastening anchors to concrete, according to an aspect. The process with which anchors are currently fastened to concrete includes typically the following steps (see FIG. 5_a_): in step S01, a hole is made in the concrete; in step S02, the anchor is inserted in the hole to take up the space created, and the material in or on the anchor is expanded in the hole, by manually hammering directly on the anchor or hammering on a setting tool 450 (if a drop-in anchor is being set); and then, finally, in step S03, a bolt (for drop-in anchors) or nut (for wedge anchors), depending on the type of anchor used, is manually ratcheted into place. Obviously, the process is labor intensive and slow, and thus, costly and inefficient.

FIG. 5_b_ illustrates a new and improved exemplary process of installing anchors, according to an aspect. As illustrated in FIG. 5_b_, using the new and improved anchor drivers disclosed herein, the process of installing anchors is simplified and much faster, yielding to increased productivity. First, in step S11, a hole is made, similarly as in the typical process described above, using a hammer drill. Secondly, in step S12, the anchor driver is secured in the chuck of the hammer drill, and, with the hammer drill in the hammer mode, the anchor is hammered into the hole using the anchor driver-hammer drill assembly; then, if a wedge anchor is being set, the hammer drill is simply switched to the drill mode, to tighten the nut of the anchor using the anchor driver-hammer drill assembly. Thus, the job is completed in step S12, and thus, the third step S13 (manual ratcheting) is completely eliminated.

It should be noted that if a drop-in anchor is being set, then in Step 12, the user may have the installation member 309 (FIG. 3_c_), with an adjustable drop-in anchor driver 461 coupled to it, installed in the chuck of the hammer drill, to first set the drop-in anchor in place, then the user may simply replace the adjustable drop-in anchor driver 461 with a socket or a first cylinder 303 (FIGS. 3_b_, 3_d_), to fasten the corresponding bolt into the drop-in anchor.

It should be also noted that no manual hammering is needed at all using the improved process. The new and improved anchor drivers, in conjunction with a hammer drill, may be used by an installer to quickly drive and secure the anchor in place, and its corresponding nut or bolt. Thus, the new process is much faster, considerably less laborious, and much more economical.

Thus, the advantages of the invention are that driving and locking anchors becomes less strenuous and time consuming, productivity is improved significantly, and prevention of injuries is achieved. The invention removes the need of hammering with a sledge hammer and then having to ratchet to lock the anchor into position. The disclosed anchor driver is a tool that can be attached to a hammer drill, which, once the hole is drilled, it hammers and ratchets an anchor (e.g. wedge anchor) into place in one step: only a simple switch of the hammer drill's mode is needed (from the hammering mode to the non-hammering rotating mode). Additional features that make the new anchor driver appealing are its small size, compactness, and light weight.

Furthermore, as explained earlier, kits may be configured, to include, for example, only one installation member 309 (FIG. 3_c_), a set of first cylinders 303 (FIGS. 3_b_, 3_d_) of various sizes and a set of adjustable drop-in anchor drivers 461 (FIGS. 4_b_-4_c_) of various sizes. Such kits would be relatively inexpensive while providing a large range of drive in and ratcheting functions for wedge and drop-in anchors of various sizes.

The anchor driver is preferably made of high strength steel, or other similar materials, that allow the tool to be used for a long time without the risk of breaking.

Another advantage of the anchor driver is that, due to the tool being driven by a hammer drill as opposed to by using physical labor, the installation is easier for the user and less restrictive, as the user may be afforded further reach by using the drill. Since most anchors are installed overhead, due to many suspensions being from concrete deck ceilings in high rise buildings, alleviating the user's need to reach upwards is another advantage. The user may also be relieved of physical labor since only the hammer drill needs to be activated and manual labor is not needed for the drilling process.

FIGS. 6_a_-6_d_ illustrate the perspective view, the top view, the side view, and the side sectional view, respectively, of another example of a wedge anchor driver having a recess ("hex anchor driver having a recess," "recessed anchor driver," or "recess hex anchor driver") 662, according to an aspect. The recessed anchor driver may be, for example, a wedge anchor driver, and may also be used with an attachment or accessory that may allow the tool to be used with drop-in anchors, as will be further discussed when referring to FIGS. 7_a_-7_c_.

In some projects, a user may be required to install a wedge anchor or a drop-in anchor into an installation surface with a large portion of the anchor's thread, rod, or bolt exposed out of the surface. The thread may then need to have additional hex nuts secured to it or other attachments or accessories, such as, for example, eye bolts. If, for example, the anchor needs to be installed in a location where the hole needs to be on top of a rebar, or the concrete in which the anchor is to be installed is shallower than the hardware available, the anchor's thread may be exposed out of the surface due to the shallowness of the installation area. In such cases, the user may be forced to improvise and tighten the hex nut down manually. This and other similar situations could then result in a larger amount of threads showing than in other typical installation processes. When a long thread is exposed out of an installation surface, the hex nut may need to be tightened, or another piece may still need to be applied to the thread, such as another hex nut or any other similar attachment or equipment. As an example, a coupling may be needed on the thread, which would allow another threaded rod to connect to the anchor. As an example, installation with a larger amount of thread exposed may be needed for permanent or temporary anchoring systems in various fields such as life safety, fire/rescue, or rock climbing. In such cases, it may not be possible to use a tool to tighten the hex nut or apply a second hex nut or other equipment, due to the fact that the tool would need to reach all the way to the hex nut or other equipment, and the thread often will be too long to allow the tool to reach the equipment being screwed. Most socket kits are not constructed to provide enough space within the took to accommodate the longer threads while reaching the hex nut or equipment being screwed on. Also, most socket kits do not accommodate various sizes of hex nuts, and thus the tools being used for the installation would have to be frequently changed during the installation project. Thus, these types of installation projects can be strenuous particularly since they must be performed by hand, and the changing of tools may cause the job to be time-consuming.

Figure 6A:
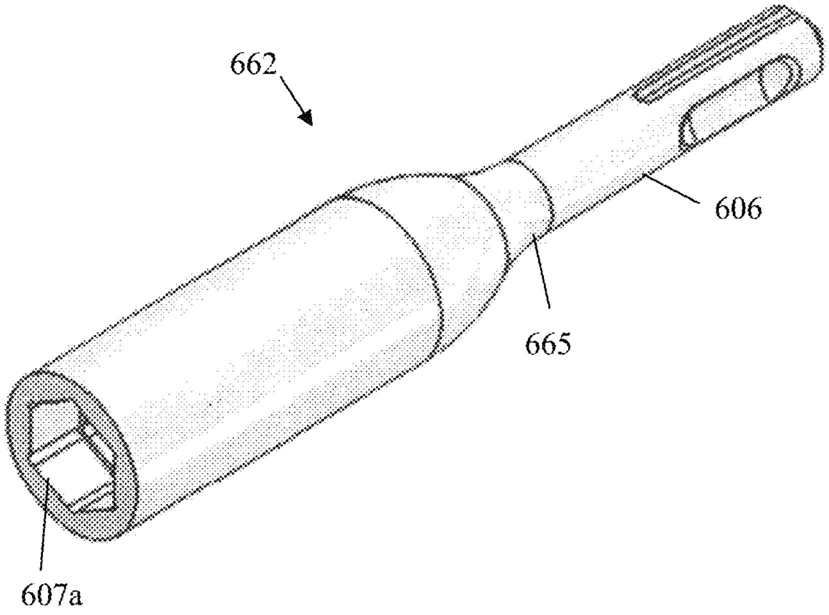
FIGS. 6*a*-6*d* illustrate the perspective view, the top view, the side view, and the side sectional view, respectively, of another example of a wedge anchor driver having a recess, according to an aspect.
Figure 6B:
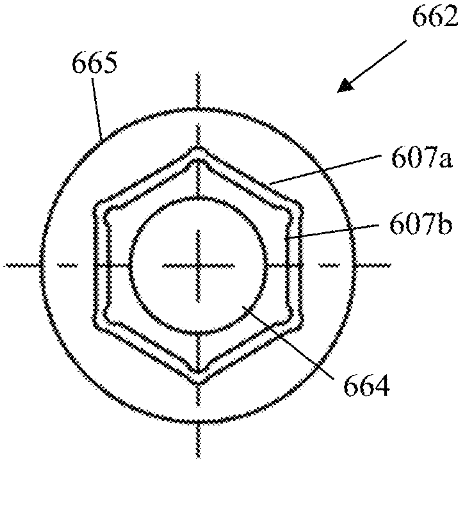
Figure 6C:
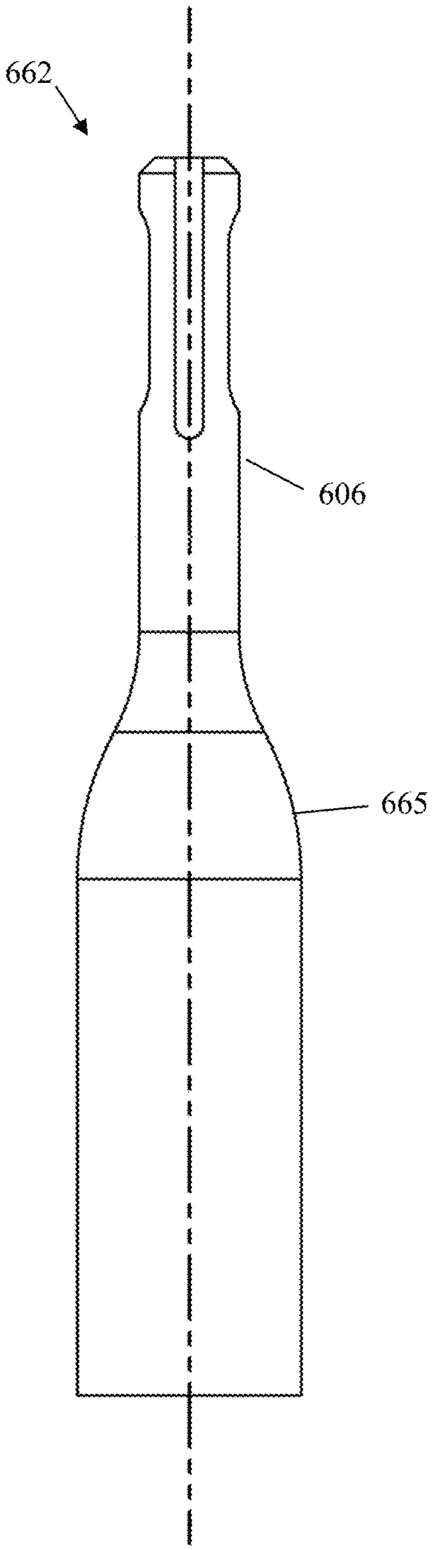
Figure 6D:
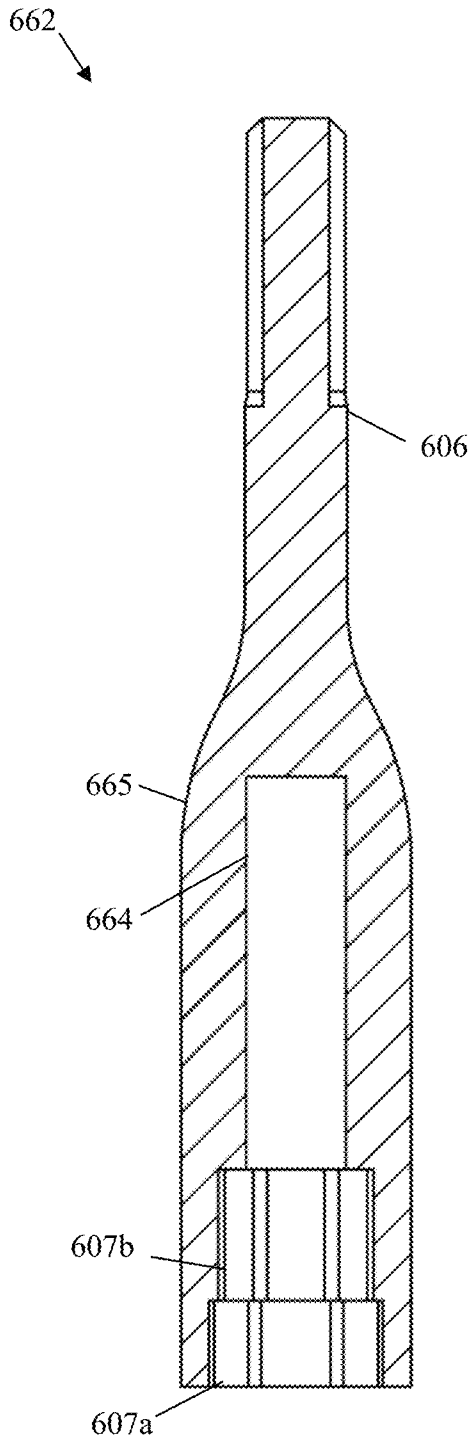

The recessed anchor driver 662 may make it possible for a single tool, or a single tool with an attachment or accessory, to be used to install a wedge or drop-in anchor when an anchor needs to be installed with a portion of thread exposed out of the installation surface, by having a first hex cavity 607*a*, a second hex cavity 607*b*, and a recess ("recess," or "third cavity") 664, as shown in FIGS. 6*b* and 6*d*.

The recessed anchor driver 662 may be provided with a shaft 606, which may be the bottom-most part of the tool opposite of a first or primary socket 607*a* located at the top-most end of the driver. The shaft 606 may quickly lock into a hammer drill by any suitable means. As an example, the shaft may be a quick-snap shaft, such that the user is provided with a quick and convenient method in changing from drill bit to the anchor driver 662 accessory. As another example, the shaft 606 may lock into a hammer drill by having a ball that fits into a portion of the hammer drill, such as the spring-loaded ball mechanism shown by 314 in FIG. 3*a*. As another example, the shaft 606 may be manufactured or provided as an accessory to any hammer drill known in the art.

Next, the recessed anchor driver 662 may be provided with a flute 665, which may be similar to the conical transition section 105 of FIG. 1. The flute 665 may house the first hex cavity 607*a*, the second hex cavity 607*b*, and the recess 664, and the flute may be a long, tapered cylinder engineered and built to transition from the shaft connection to the tip of the tool. The flute may be constructed to have enough thickness to withstand the force of the hammer drill and the impact with the anchors while still allowing the inner cavity or recess 664 serve and aid the process of installing the anchor. The flute 665 may also be manufactured to come apart from the shaft 606 in, for example, a snap-on or twist-off method, which may allow for an all-in-one kit to be provided to users.

The first or primary hex-nut cavity ("first hex cavity," "first cavity," "first hex socket," or "primary socket") 607*a*, may be located at the top end of the anchor driver as shown in FIGS. 6*a* and 6*d*, and may be similar to the first opening 307*a* when referring to FIGS. 3*a*-3*d*. The socket or opening may be a hex-nut cavity 607*a* having, for example, a hexagonal cross-section, sized to fit a suitable nut of a typical wedge anchor or other similar anchor. The first hex cavity 607*a* may receive a hex nut from any suitable anchor being driven, and may thus be used to chisel the anchor into the installation surface. The first hex cavity 607*a* may also be used for driving any other hexes needed such as, for example, installation of eye bolts or any other suitable equipment. The first hex cavity 607*a* may function similar to a socket wrench, while allowing the user to accomplish the task of chiseling in the anchor using a hammer drill as opposed to by hand. As an example, the first hex cavity 607*a* may be a 9/16 inch socket.

Next, after the anchor is installed into a surface, it may be required to tighten the anchor by using a second hex nut, or it may be required to install additional equipment such as a coupling or an eye bolt. This task may typically require a different size hex nut. As an example, in high-rise buildings with decks made of concrete, the wedge anchor is the only approved anchor to suspend all required material onto ceilings after the concrete is poured and ready. This is due to the fact that the wedge anchor locks as it is pulled out, wedging its cone into the back of the anchor permanently. The problem that exists with this system is that while installing the extension from the anchor, the second hex nut, which may be a coupling, is longer and slightly smaller than the first hex that locked the anchor in place. Thus, this may often result in the user having to switch tools back and forth, and manually turn the second hex with an adjustable wrench, for example, since many sockets or tools available can only fit one size of socket. The recessed anchor driver 662 may be provided with a second or secondary hex-nut cavity ("second hex cavity," "second cavity," "second hex socket," or "secondary hex socket") 607*b*, which may be slightly smaller and longer than the first hex-nut cavity 607*a*, as shown in FIG. 6*d*, and thus may be appropriately sized to fit a coupling that is longer and smaller than the first hex used for the anchor. The second hex-nut cavity 607*b* may be provided below the first hex cavity 607*a*, again, as shown in FIG. 6*d*. After driving the first hex using the first hex cavity 607*a*, a smaller size hex may need to be driven and can be received into the second hex cavity 607*b*. The second hex cavity 607*b* may thus drive the second hex and may also drive coupling hardware. Thus, the differently-sized second hex-nut cavity 607*b* may provide the recessed anchor driver 662 with multiple uses. As an example, the second hex cavity 607*b* may be any suitable socket smaller than the size provided by the first hex cavity 607*a*. As an example, the second hex cavity 607*b* may be a ½ inch hex socket.

Again, as discussed earlier, when driving a second hex, coupling, or other equipment, a rod or thread may protrude from the installation surface. The recessed anchor driver 662 may be provided with a recess, space, or cavity 664 behind the second hex cavity 607*b*. The recess 664 may be longer than the opening 208*a* provided in the anchor driver referred to when discussing FIG. 2*d*, and may be longer than the opening 308*a* provided in the anchor driver referred to when discussing FIG. 3*b*. The recess 664 of the recessed anchor driver 662 may be long enough to accommodate the rod or thread protruding from the anchor while driving a hex nut or other equipment onto the thread, when a large amount of thread is exposed out of the installation surface. The rod or thread may be housed in the recess 664 as the first hex cavity 607*a* or the second hex cavity 607*b* reaches a hex and drives it. Again, similar to the second opening 308*a* of the anchor driver discussed when referring to FIGS. 3*a*-3*b*, the recess 664 may be shaped and sized to fit the expected length of an exposed thread or rod during such installation projects, and, again, the recess 664 may be longer than the opening 308*a* provided in an anchor driver having only a single socket type. The recess 664 may be a slightly exaggerated cylinder space that allows enough room for extra threads of the anchor's rod or thread to penetrate into the anchor driver. The size and depth of the recess 664 may vary according to the sizes and types of anchors that the anchor driver is used for. The flute 665 and the recess 664 may be manufactured or provided to meet any suitable specific industry standard or requirement.

The recessed anchor driver 662 may thus eliminate the need for manual labor during this process, and may eliminate the need for additional tools or accessories to accomplish the installation, or additional hex nuts to secure the accessories. The recessed anchor driver 662 may also resolve the problem of securing an anchor with exposed threads in any location that requires eye bolts or plates added on top of the anchor system, and can save time and labor for the user. The elimination of additional accessories or hex nuts may also be advantageous in such fields where the weight and amount of tools is crucial and can affect the safety of the user, or when speed is critical in safety or rescue situations. Another advantage may be that money can be saved in the construction trade since the recessed anchor driver may eliminate wasted money on specialty tools, as well as the time and effort spent on switching tools to drive the anchors manually. Another advantage may be that a user may easily install anchor drivers in projects where extra threads are needed to protrude out from the installation surface without the need for manual labor. Another advantage may be that the need to switch out and use multiple other tools is eliminated.

The longer recess 664 of the recessed anchor driver 662 may also allow for the user to correct for any errors during the process when more thread is to be exposed, such as, for example, by allowing a user to measure the amount of thread that is exposed out of the installation surface by fitting it into the recess 664. A user may thus easily see how much thread is exposed and may be able to correct the problem if too much thread is exposed, and may be able to drill the anchor in further if needed.

An example of an exemplary process known in the art for installing a wedge anchor system may carry out the following exemplary steps. First, in step one, a hole is drilled with a concrete drill bit and hammer drill. Next, in step two, the anchor is physically hammered. Typically, this is done overhead into a ceiling, since most suspensions in high rise buildings are on concrete deck ceilings. Next, in step three, the anchor is permanently locked in place by using a socket or adjustable wrench to turn the hex nut. Next, in step four, the slightly smaller and longer hex coupling is screwed by hand onto the threads that protrude past the anchor, as far as the hex can be screwed in by hand. Next, in step five, the hex is turned and tightened using an adjustable wrench or channel lock, because most couplings do not match all sockets in custom kits. An advantage of the wedge anchor system described in FIGS. 6*a*-7*c* is that steps two and three may be combined, by eliminating the need for manually hammering and eliminating the need to switch tools to a provide a socket, as the hammer drill can do both steps effortlessly and simultaneously. The combined steps two and three may be performed by using the first hex cavity 607*a*. The installation time may thus be cut by more than half, and also increase safety of the job. Specialty sockets and change tools are also no longer needed by the user, since an adjustable wrench is no longer needed to tighten the hex coupling. Thus, steps four and five are also combined, by placing the coupling into the slightly smaller second hex cavity 607*b* to drive and lock the coupling in on the threads quickly and efficiently in one swift motion with the hammer drill.

Figure 7A:
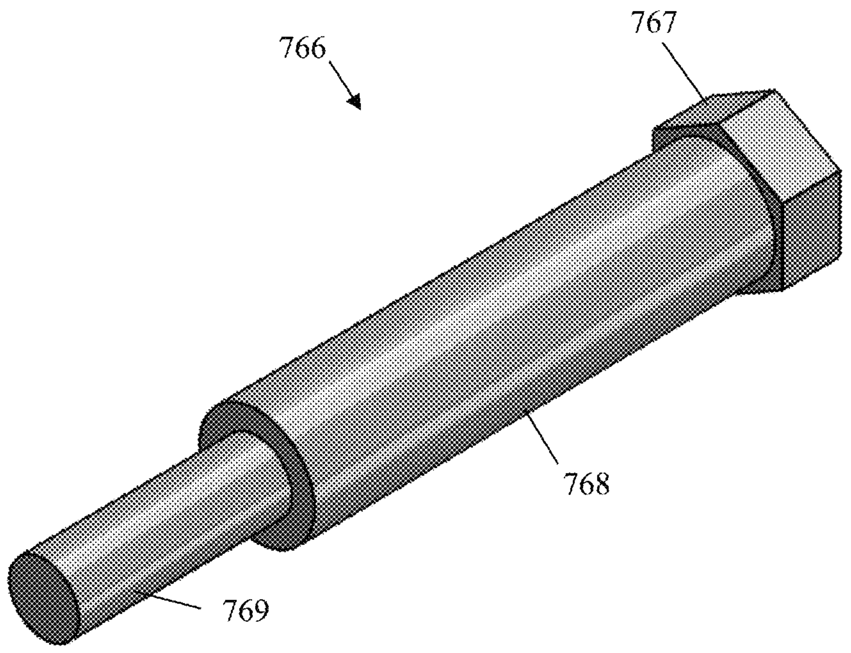
FIGS. 7*a*-7*c* illustrate the perspective view, the side view, and the top view, respectively, of a solid hex drop-in anchor driver attachment, according to an aspect.
Figure 7B:
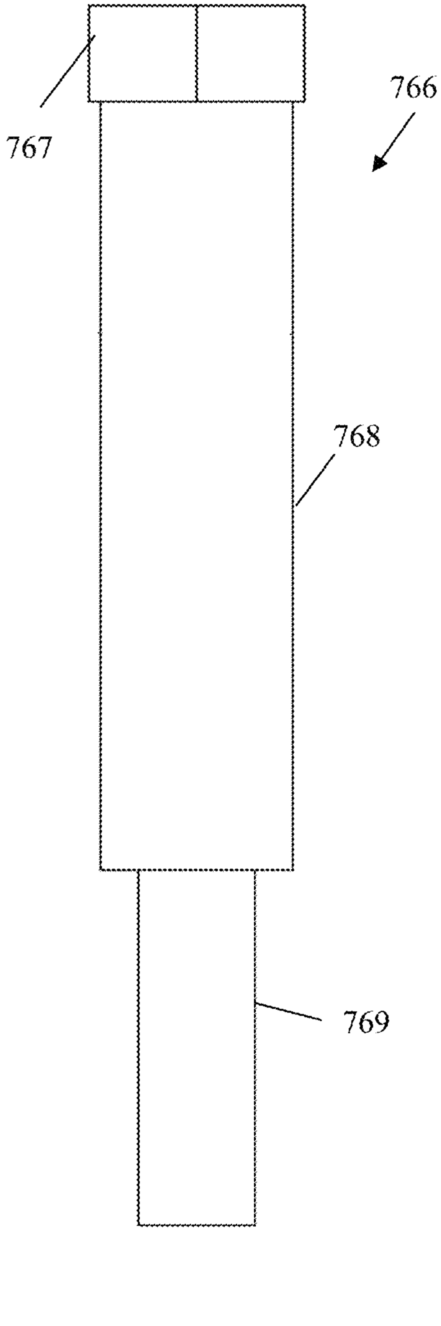
Figure 7C:
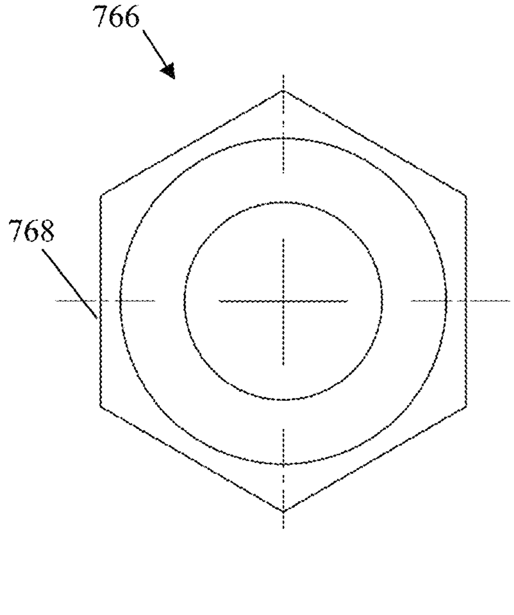

FIGS. 7*a*-7*c* illustrate the perspective view, the side view, and the top view, respectively, of a solid hex drop-in anchor driver attachment ("solid hex drop-in anchor driver attachment," or "anchor driver attachment") 766, according to an aspect. The anchor driver attachment 766 may be used in combination with the anchor driver 662 as described when referring to FIGS. 6*a*-6*c*, and may thus allow the recessed anchor driver 662 to be used for both wedge anchors and drop-in anchors.

Installation of a drop-in anchor typically involves a hand-held pin chisel, which needs to be hit with a hammer to set the pin. This means that a user must use both hands to install the drop-in anchor, which may be difficult in extremely tight or small spaces. The two-handed operation is also time-consuming, and it can be difficult for a user to properly center the pin chisel correctly over the pin, and hit the chisel with enough effort to drive the pin in. During installation of a drop-in anchor, the pin needs to be driven down significantly, so as to drive out and open up the base of the anchor such that when the bolt is driven in, the anchor does not freely spin, which would render the anchor useless, or cause the user to spend excess time on the installation process.

Similar to the solid hex drop-in anchor driver 463 shown in FIGS. 4*f*-4*g*, the solid hex drop-in anchor driver attachment 766 may be provided with a shaft 767, which may be similar to the third section 460*d* of the solid hex drop-in anchor driver 463 of FIGS. 4*f*-4*g*. Again, the shaft 767 may be a section that is inserted, completely or partially, and then fastened, directly into a chuck of a standard hammer drill or may be attached to a recessed anchor driver 662 shown in FIGS. 6*a*-6*d*. The shaft 767 may be short and sized to be compatible with a recessed anchor driver 662. The shaft 767 may connect to the hammer drill or the anchor driver 662 by a snap-on, twist-on, or any other similar locking mechanism, for example, which may allow for quick connection or removal of the anchor driver 766. Again, a spring-loaded ball mechanism such as the example shown by 314 in FIG. 3*a* may be used to lock the anchor driver attachment 766 to the anchor driver 662 or hammer drill, wherein the anchor driver attachment has a spring-loaded ball that fits into an opening in the interior of the anchor driver's first cavity.

As another example, the shaft may be manufactured to sit in a socket cavity to allow for the quick removal of any attachment pieces. The anchor driver 766 may eliminate the need for changing tools and improving the efficiency of anchor installation. Next, the solid hex drop-in anchor driver 766 may be provided with a flute 768, which may be provided as a solid piece, and may also be shorter than the flute provided by the drop-in anchor driver referred to when discussing FIGS. 4*b*-4*g*, for example. The shorter and more compact size and shape of the anchor driver attachment 766 may provide a user with better control over the anchor installation.

Next, the solid hex drop-in anchor driver 766 may be provided with a pin chisel end ("pin chisel end," or "pin") 769, which may be a smaller cylinder than the flute 768. The flute 768 may have a diameter larger than the pin 769 in order to create a stop area when the pin is inserted into a drop-in anchor, and the shaft of the attachment may have a diameter larger than the diameter of the flute. The pin 769 may be manufactured to have an appropriate size to fit and push the expander plug that the anchor driver is adapted to drive. Similar to the driver as described in FIGS. 4*b*-4*c*, the pin 769 may be inserted into a drop-in anchor to push the expander plug (not shown) into the drop-in anchor as described in paragraph 0048.

The solid hex drop-in anchor driver attachment 766 may thus provide a way to attach the pin driver and lock it into an anchor driver 662, allowing the use of a hammer drill to drive in a drop-in anchor, thus eliminating the need for manually hammering or the need to use both hands at once for installing an anchor. An advantage may be that a single anchor driver 662, used in combination with an attachment piece 766, may allow a user to install both wedge anchors and drop-in anchors, as well as other equipment such as couplings to the anchors. Another advantage may be that the anchor installation is safer, easier, and more efficient for the user, particularly when installation is needed in awkward, hazardous, or overhead locations. Another advantage may be that the anchor driver 662 and the anchor driver attachment 766 may allow a user to install anchors one-handed.

It may be advantageous to set forth definitions of certain words and phrases used in this patent document. The term “couple” and its derivatives refer to any direct or indirect communication between two or more elements, whether or not those elements are in physical contact with one another. The term “or” is inclusive, meaning and/or. The phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, “plurality” means two or more. A “set” of items may include one or more of such items. Whether in the written description or the claims, the terms “comprising,” “including,” “carrying,” “having,” “containing,” “involving,” and the like are to be understood to be open-ended, i.e., to mean including but not limited to. Only the transitional phrases “consisting of” and “consisting essentially of,” respectively, are closed or semi-closed transitional phrases with respect to claims.

If present, use of ordinal terms such as “first,” “second,” “third,” etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, “and/or” means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A wedge anchor driver for driving a wedge anchor having a bolt into an installation surface such that a portion of the bolt is exposed out of the installation surface, the wedge anchor driver comprising:
- a top end;
- an anchor driver shaft at a bottom end;
- a flute extending between the top end and the anchor driver shaft, the flute housing a plurality of cavities comprising:
  - a first cavity at the top end, the first cavity being configured to fit onto a first nut of the wedge anchor, and the first cavity having a first hex socket size;
  - a second cavity below the first cavity, the second cavity being configured to fit onto a second nut, the second cavity having a second hex socket size smaller than the first socket size; and
  - a third cavity below the second cavity, the third cavity being configured to receive the portion of the bolt;
- a drop-in anchor attachment for driving a drop-in anchor having an expander plug, the drop-in anchor attachment having three coaxial sections comprising:
  - a pin having a first diameter, the pin being insertable into the drop-in anchor to push the expander plug into the drop-in anchor;
  - an attachment flute having a second diameter greater than the first diameter for creating a stop area; and
  - an attachment shaft having a third diameter greater than the second diameter, wherein the attachment flute extends between the pin and the attachment shaft; and
  - wherein the attachment shaft is removably associated with the first cavity such that the wedge anchor driver can be adapted to drive the drop-in anchor; and
- wherein the anchor driver shaft is configured to fit and be lockable into a hammer drill, such that after the wedge anchor driver is locked into the hammer drill, a user can drive the wedge anchor or the drop-in anchor into a corresponding hole with the hammer drill in a hammer mode, and then tighten the first nut or the second nut by switching the hammer drill from the hammer mode to a drill mode.

2. The wedge anchor driver of claim 1, the first cavity further comprising an opening on an interior side of the flute, and the drop-in anchor attachment further comprising a spring-loaded ball, and wherein the association of the drop-in anchor attachment with the first cavity is obtained by inserting the attachment shaft into the first cavity such that the spring-loaded ball is received into the opening.

3. The wedge anchor driver of claim 1, wherein the first cavity is a 9/16 inch hex socket.

4. The wedge anchor driver of claim 1, wherein the second cavity is a ½ inch hex socket.

5. The wedge anchor driver of claim 1, wherein the flute has a first flute length, and the attachment flute has a second attachment flute length shorter than the first flute length.

6. A wedge anchor driver for driving an anchor having a bolt into an installation surface such that a portion of the bolt is exposed out of the installation surface, the wedge anchor driver comprising:

a top end;

an anchor driver shaft at a bottom end;

a flute extending between the top end and the anchor driver shaft, the flute housing a plurality of cavities comprising:

a first cavity at the top end, the first cavity being configured to fit onto a first nut of the wedge anchor, and the first cavity having a first socket size and a first length;

a second cavity below the first cavity, the second cavity being configured to fit onto a second nut, the second cavity having a second socket size smaller than the first socket size and a second length greater than the first length; and a third cavity below the second cavity, the third cavity being configured to receive the portion of the bolt;

wherein the anchor driver shaft is configured to fit and be lockable into a hammer drill, such that after the wedge anchor driver is locked into the hammer drill, a user can drive the anchor into a corresponding hole with the hammer drill in a hammer mode, and then tighten the first nut or the second nut by switching the hammer drill from the hammer mode to a drill mode.

7. The wedge anchor driver of claim 6, wherein the first cavity and the second cavity each have a hexagonal cross-section, and wherein the third cavity is cylindrical.

8. The wedge anchor driver of claim 7, wherein the attachment shaft is a solid hex corresponding with the hexagonal cross-section of the first cavity.

9. The wedge anchor driver of claim 6, wherein the first cavity is a 9/16 inch hex socket.

10. The wedge anchor driver of claim 6, wherein the second cavity is a ½ inch hex socket.

11. The wedge anchor driver of claim 6, further comprising a drop-in anchor attachment for driving a drop-in anchor having an expander plug, the drop-in anchor attachment having three coaxial sections comprising:

a pin having a first diameter, the pin being insertable into the drop-in anchor to push the expander plug into the drop-in anchor;

an attachment flute having a second diameter greater than the first diameter for creating a stop area; and an attachment shaft having a third diameter greater than the second diameter, wherein the attachment flute extends between the pin and the attachment shaft, and wherein the attachment shaft is removably associated with the first cavity such that the wedge anchor driver can be adapted to drive the drop-in anchor.

12. The wedge anchor driver of claim 11, the first cavity further comprising an opening on an interior side of the flute, and the drop-in anchor attachment further comprising a spring-loaded ball, and wherein the association of the drop-in anchor attachment with the first cavity is obtained by inserting the attachment shaft into the first cavity such that the spring-loaded ball is received into the opening.

* * * * *